US006433536B1

United States Patent
Yundt et al.

(10) Patent No.: US 6,433,536 B1
(45) Date of Patent: Aug. 13, 2002

(54) APPARATUS FOR MEASURING THE POSITION OF A MOVABLE MEMBER

(75) Inventors: George B. Yundt, Cambridge, MA (US); Bradley A. Trago, Rockford, IL (US); Robert E. Lordo, Tega Cay, SC (US); Harry B. Behm, Lawrence, MA (US)

(73) Assignee: Pacsci Motion Control, Inc., Wilmington, MA (US)

( * ) Notice: Subject to any disclaimer, the term of this patent is extended or adjusted under 35 U.S.C. 154(b) by 0 days.

(21) Appl. No.: 09/223,943

(22) Filed: Dec. 31, 1998

(51) Int. Cl.[7] .............................. G01B 7/30; G01B 7/14
(52) U.S. Cl. ............................ 324/207.22; 324/207.2; 324/207.24; 324/207.25
(58) Field of Search .................. 324/207.18, 207.24, 324/207.25, 207.12, 207.11, 207.16, 207.17, 207.2, 207.22, 160, 117 R, 117 H, 165, 166, 167, 207.21, 174, 173; 335/302

(56) References Cited

U.S. PATENT DOCUMENTS

| | | | | |
|---|---|---|---|---|
| 2,805,677 A | * | 9/1957 | Baird | 324/207.18 |
| 3,777,273 A | * | 12/1973 | Baba et al. | 329/200 |
| 5,059,900 A | * | 10/1991 | Phillips | 324/160 |
| 5,159,268 A | * | 10/1992 | Wu | 324/207.2 |
| 5,162,798 A | | 11/1992 | Yundt | 341/116 |
| 5,172,052 A | * | 12/1992 | Wells | 324/117 R |
| 5,321,355 A | * | 6/1994 | Luetzow | 324/207.2 |

* cited by examiner

Primary Examiner—Jay Patidar
(74) Attorney, Agent, or Firm—McDermott, Will & Emery (57) ABSTRACT

The present invention is an apparatus for indicating the instantaneous position of a movable member along a range of motion with respect to a reference position. The apparatus includes a magnetic body that is fixedly attached to the movable member. The body has a contoured surface to control the shape of a magnetic field relative to position, and further includes at least two magnetic field sensors. Each of the sensors is disposed adjacent to the contoured surface of the magnetic body and fixed with respect to the reference position, and is positioned apart from the other sensors, so as to form a non-uniform gap between the contoured surface and each of the magnetic field sensors. Each of the sensors produces a position dependent signal corresponding to a value of the magnetic field. The apparatus further includes a decoding circuit electrically coupled to each of the magnetic field sensors so as to receive each of the position dependent signals. The decoding circuit produces a position dependent signal that is a predetermined function of the position dependent signals. Multiple sensors can be utilized to provide redundancy. Further, the apparatus can provide measurement correction of measurement errors caused by incorrect location of the magnetic field sensors.

9 Claims, 3 Drawing Sheets

APPARATUS FOR MEASURING THE POSITION OF A MOVABLE MEMBER

CROSS-REFERENCE TO RELATED APPLICATIONS

Not Applicable.

STATEMENT REGARDING FEDERALLY SPONSORED RESEARCH

Not Applicable.

REFERENCE TO MICROFICHE APPENDIX

Not Applicable

FIELD OF THE INVENTION

The present invention relates to magnetic position encoders, and more particularly to magnetic position encoders utilizing mechanically shaped, magnetic field generating disks to optimize the resulting magnetic field pattern.

BACKGROUND OF THE INVENTION

Many applications require instantaneous information regarding the linear or angular position of one element relative to another. For example, it is often desirable to measure the position of a rotating shaft with respect to a fixed reference, such as a stator holding the shaft bearings. Devices that measure such an angular position are well known in the art and include resolvers, optical encoders, magnetic encoders, rotary potentiometers, and others. Such devices, known for example as position encoders or position sensing devices, all have various economic and performance trade-offs. In particular, the least expensive high resolution position sensing devices are typically incremental as opposed to absolute. An incremental position sensing device is characterized by the fact that it only produces positional information regarding a movable member in the form of a quantized change from the previous position. The resolution of the device is defined by the smallest quantum of positional change that the sensing device can indicate (i.e., an angular increment for rotational sensing device or lineal increment for a linear sensing device). Such devices typically incorporate associated electronics that require external power. Once power is applied to the associated electronics of an incremental position sensing device, the device can begin producing incremental position information. By utilizing appropriate interface electronics (e.g., an accumulator), such sensors can keep track of how far the movable member has traveled since external power has been applied, but the absolute position is unknown, because the device has no information regarding the position of the movable member at the time the power was applied.

One type of prior art absolute position sensing device operates by producing a magnetic field that is fixed relative to the movable member, and sensing the magnetic field at a fixed reference position (relative to the movable member) as the movable member travels through its range of motion. In one such absolute position sensing device for sensing the angular position of a rotatable shaft, the magnetic field is generated by a permanently magnetized disk, fixedly mounted to the shaft. The fixed sensor produces a discrete output at the maxima of the detected magnetic field. Ideally, the field variation detected by the fixed sensor is sinusoidal, with the maxima occurring at the poles of the magnetized disk. One disadvantage to such a sensing device is that the sinusoidal field detected at the fixed sensor tends to be distorted, i.e., the detected waveform includes higher order harmonics, in addition to the desired fumdamental sinusoid. This distortion introduces an error in the estimate of position.

It is an object of this invention to provide a position encoder that substantially overcomes or reduces the aforementioned disadvantages while providing other advantages which will be evident hereinafter.

SUMMARY OF THE INVENTION

The present invention is an apparatus for indicating the instantaneous position of a movable member, movable along a range of motion with respect to a reference position. The apparatus includes a magnetic body that is fixedly attached to the movable member. The body has a contoured surface and produces a magnetic field. The apparatus further includes at least two magnetic field sensors. Each of the sensors is disposed adjacent to the contoured surface of the magnetic body, fixed with respect to the reference position, and is positioned apart from the other sensors, so as to form a non-uniform gap between the contoured surface and each of the magnetic field sensors. Each of the sensors produces a position dependent signal corresponding to the value of the magnetic field. The apparatus further includes a decoding circuit electrically coupled to each of the magnetic field sensors so as to receive each of the position dependent signals. The decoding circuit produces a position dependent signal that is a predetermined function of the magnetic field sensor position dependent signals.

In one preferred embodiment, the magnetic field sensors include at least two sets of two magnetic field sensors, so as to provide electrically redundant position dependent signals.

In yet another embodiment, the gap is tailored to vary as a periodic non-uniform function between $g_{max}$ and $g_{min}$ and having an inverse sinusoidal component.

In another embodiment, the non-uniform gap is tailored so as to produce a sinusoidal variation with the position of the movable member with respect to the reference point.

In one embodiment, the magnetic body is selected from the group consisting of a permanent magnet, an electromagnet, a high mu material, a combination thereof, or a combination thereof with non-magnetic materials.

In another embodiment, the magnetic body is rotatable and includes N magnetic poles, where N is preferably an integer evenly divisible by four so that redundant magnetic field sensors can be incorporated.

In another embodiment, the movable member and the magnetic body are combined so as to include a single magnetic member.

In another embodiment, each of the magnetic field sensors further includes at least one adjustment screw disposed substantially adjacent to the magnetic field sensor so as to interact with the magnetic field. The position dependent signal amplitude varies as a predetermined funtion of a relative distance from the magnetic field sensor to the adjustment screw. The adjustment screw includes a high magnetic permeability material.

In another embodiment, the magnetic field sensors include linear Hall effect sensors.

In another embodiment, the movable member includes a shaft rotatable about a rotation axis, and a disk having an outer periphery defined by a non-uniform radius. The disc is fixedly attached to the shaft at the disc center such that the disk rotates within a plane substantially normal to the rotation axis. The magnetic body is fixedly attached to the disk, and the magnetic field sensors are disposed about the outer periphery at substantially equal radii with respect to the rotational axis.

In another embodiment, the apparatus further includes two sets of three magnetic field sensors disposed at angular intervals substantially equal to 120 degrees.

In another embodiment, the movable member includes an elongated object movable along a linear axis. The elongated object has at least one exterior surface substantially parallel to the linear axis, and the magnetic field sensors are disposed along the exterior surface at substantially equal radial distances with respect to the linear axis.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE INVENTION

Figure 1A:
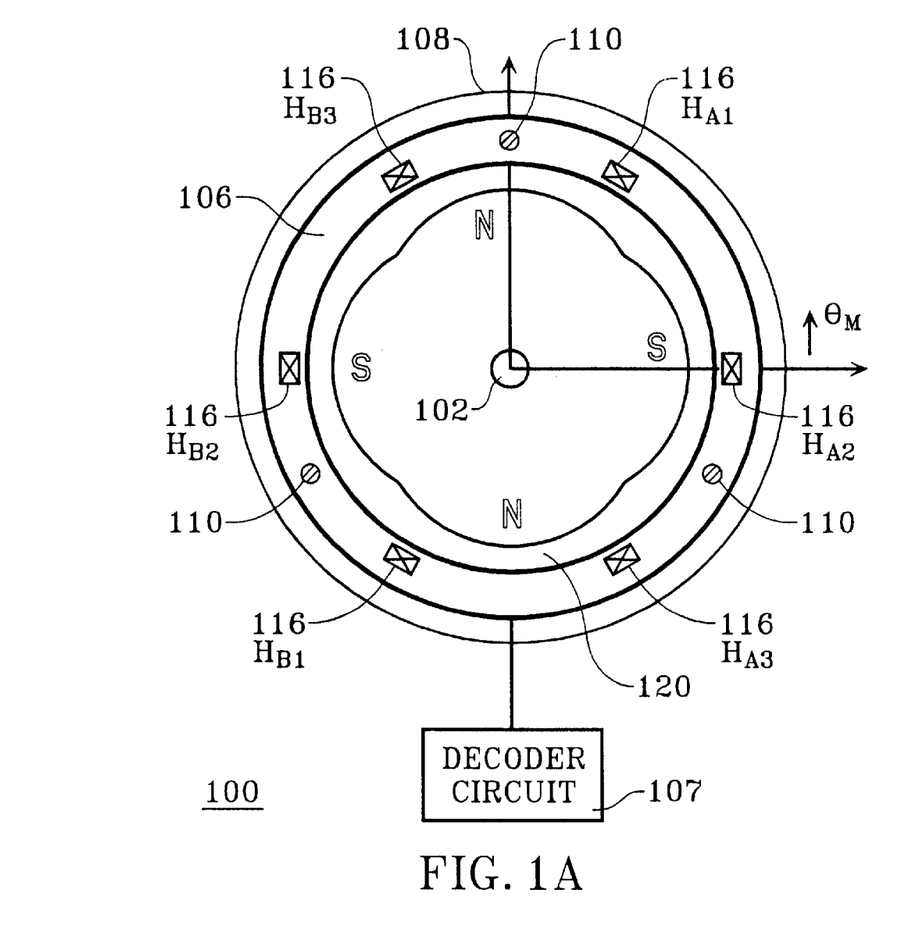
FIG. 1A illustrates an end schematic view of one preferred embodiment of an improved angular position encoder.
Figure 1B:
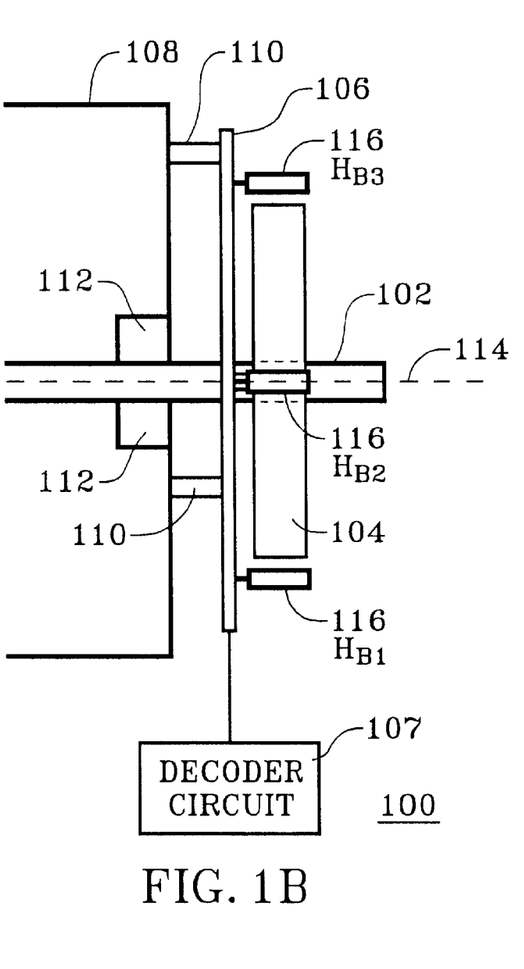
FIG. 1B illustrates a side schematic view of the FIG. 1A embodiment.

The invention is directed to an improved position encoder, also referred to by the Applicant as the "G-coder". FIGS. 1A and 1B illustrate orthogonal schematic views of one preferred embodiment of an improved position encoder 100 that may be used to measure angular position of an object with respect to a fixed reference position (e.g., rotational angle $\theta_M=0$), including a shaft 102, a shaped disc 104 fixedly attached to the shaft 102, a magnetic field sensor ring 106 concentric with the disc 104 and the shaft 102, and a decoder circuit 107 electrically coupled to the sensor ring 106. The sensor ring 106 is fixedly mounted to the stator housing 108 via ring mounting supports 110. The stator housing 108 supports the bearings 112 that rotatably secure the shaft 102 to the stator housing 108.

The disc 104 mounted on the shaft 102 includes a magnetic material disc having a predetermined magnetic field characteristic. This field characteristic may include a substantially constant magnetic field, produced for example by permanent magnet or a conductor carrying a direct current. Alternately, the predetermined field characteristic may include a magnetic field having a time varying amplitude that varies in a predetermined manner, e.g., sinusoidal amplitude modulation, as the shaft rotates. In one embodiment, the magnetic material disc 104 is fabricated entirely from one of several permanent magnet materials known to those in the art, or a combination thereof. In alternate embodiments, the magnetic material disc 104 includes a permanent magnet, an electromagnet, a high mu material (i.e., a material having a relatively high magnetic permeability), or non-magnetic materials, or a combination thereof (e.g., for a hub to mount the disc onto the shaft). In another embodiment, the magnetic field originates from an electromagnet, driven synchronously by a sinusoidal source, to produce an amplitude modulated magnetic field. In all of the preferred embodiments, the disk 104 produces a magnetic field that varies spatially with respect to shaft rotation angle θ. In FIG. 1, the magnetic field produced by the disk 104 is radially oriented with respect to the shaft axis of rotation 114. In an alternate embodiment, the shaft 102 and the disc 104 may be combined or integrated to form a single component that produces a magnetic field.

The magnetic field sensor ring 106 includes a plurality of magnetic field sensors 116 distributed about the shaft 102. The magnetic field sensors 116 linearly measure the value of the magnetic field produced by the magnetic material disc 104. In the illustrative embodiment of FIG. 1, each of the six independent magnetic field sensors 116 measures the radial component of the magnetic field produced by the disc 104, and substantially rejects components of the magnetic field orthogonal to the radial component. In a preferred embodiment, the magnetic field sensors 116 include linear Hall effect type sensors, although alternate embodiments may include other magnetic sensors known to those in the art.

The rotational nature of the structure shown in FIG. 1 causes the output from a given magnetic field sensor to be periodic as a function of the rotational angle $\theta_M$. Any periodic function can be decomposed into its harmonic terms via a Fourier Series, which is repeated below for reference:

$$Y_{A1}(\theta_M) = \sum_{n=-\infty}^{+\infty} [A_n \cos(n\theta_M) + B_n \sin(n\theta_M)]$$

The output of the other magnetic field sensors would ideally be given by $Y_{A1}(\theta_M-\theta_O)$ where $\theta_O$ is determined by the angular distance between the magnetic field sensors.

To illustrate how the embodiment of the invention shown in FIG. 1 measures the shaft mechanical angle, assume there are only two magnetic field sensors on the sensor ring 106 separated by 45 mechanical degrees instead of six magnetic field sensors 116 being distributed about the sensor ring 106 at intervals of 60 mechanical degrees, as shown. Then, given appropriate magnetic material disc magnetization and air gap shape, the outputs of the two sensors are given by:

$$Y_{A1}(\theta_M) = A \cos(2\theta_M)$$

$$Y_{A2}(\theta_M) = A \sin(2\theta_M)$$

The angle θ is easily determined when both the cosine and sine of θ are known. Thus, for a system with two magnetic field sensors, is it possible to uniquely determine $2\theta_M$, i.e., determine the absolute angular position of the shaft within one half of a mechanical revolution. Circuitry to perform this function within the decoder circuit 107 is well known for interfacing to resolvers, which have the cosine sine output signal format given above, except for being amplitude modulated by a carrier. U.S. Pat. No. 5,162,798, entitled RESOLVER TO DIGITAL CONVERTER, invented by Yundt, discloses an example of such an angle conversion apparatus.

Note that the sensor output signals, $Y_{Ax}$ (where x=1, 2, etc.), do not have to be purely sinusoidal. A decoding circuit 107 could be constructed for any a priori sensed magnetic wave shape, as long as the generalized function of the output of all the magnetic field sensors taken together is a single valued function of the position. The pure sinusoidal case is shown in the illustrative embodiment because it is one of the simpler magnetic wave shapes to decode. In another embodiment, the sensor output could be in the form of a triangle wave, e.g., vary the sensed magnetic field linearly from minus $B_o$ to plus $B_o$ over 180 electrical degrees and visa versa over the next 180 electrical degrees.

If the desired result is a pure sinusoid and the resulting output from the magnetic field sensor does have some distortion, then additional magnetic field sensors can be used to partially cancel that distortion. Consider the case shown in FIG. 1A which includes three magnetic field sensors 116 ($H_{A1}$, $H_{A2}$ and $H_{A3}$) spaced at intervals of 120 electrical degrees. (Note that because the disk 104 includes a magnetic pole every 90 mechanical degrees, one mechanical degree corresponds to two electrical degrees for angular measurement about the rotation axis 114 with respect to a fixed reference point. Thus, placing the magnetic field sensors 116 about the disk at intervals of 120 electrical degrees is equivalent to placing the magnetic field sensors about the disk at intervals of 60 mechanical degrees.) If the $Y_{Ax}$ output signals are purely sinusoidal with third harmonic distortion, then by looking at the line-line output signal (i.e., the difference signal between any two sensors), the third harmonic distortion term may be canceled. For example, consider $Y_{A1} - Y_{A2}$ for the disk shape and sensor placement of FIG. 1A:

$$Y_{A1}(\theta_M) - Y_{A2}(\theta_M) = [A\cos(2\theta_M) + B\sin(6\theta_M)] - \{A\cos[2(\theta_M + 2\pi/3)] + B\sin[6(\theta_M + 2\pi/3)]\}$$

$$= [A\cos(2\theta_M) + B\sin(6\theta_M)] - \{A\cos[2(\theta_M + 2\pi/3)] + B\sin[6\theta_M + 4\pi]\}$$

$$= A\cos(2\theta_M) - A\cos[2(\theta_M + 2\pi/3)]$$

Thus, the third harmonic distortion term for a line-line signal is canceled. In fact, any distortion term representing a harmonic number divisible by three would be canceled by this technique. More generally, for two magnetic field sensors placed $2\pi/N$ electrical degrees apart, N being an integer, the line-line output signal rejects any harmonic distortion term which is an integer multiple of N. Note that looking at sensors line-line also has the advantage of greatly helping to reject any common mode noise that might be injected into the signal over the cable between the magnetic field sensors 116 and the associated decoding electronics 107.

The six magnetic field sensors 116 shown in FIG. 1A are set at the same radial distance from the shaft and they are spaced at equal 60 mechanical degree intervals about the periphery of the disc 104. These six magnetic field sensors 116 are segregated into two groups of three; the three on the right side of FIG. 1A ($H_{A1}$, $H_{A2}$ and $H_{A3}$) and the three on the left side of FIG. 1A ($H_{B1}$, $H_{B2}$ and $H_{B3}$) form these two groups. Each of these groups forms a fully functional sensor output that may be used to determine the absolute angular position of the shaft within one half of a complete mechanical revolution. The dual electrical outputs from the two sets of sensors of this embodiment provides redundancy that may be used to form a high reliability system. In addition, using three magnetic field sensors 116 in each group instead of the minimum requirement of two per group allows redundancy within the set. For a fully functioning system, the three magnetic field sensor outputs from each group form a balanced three-phase waveform set, and the sum of the three signals $Y_{A1}+Y_{A2}+Y_{A3}$ should equal 0. A non-zero sum may be interpreted by the decoder circuitry 107 to detect faulty hardware.

The goal of the magnetic design of the magnetic material disc 104 and the geometric placement of the magnetic field sensors 116 is to create the desired $Y(\theta_M)$ on the output of the magnetic field sensors 116. It is theoretically possible with a sufficiently complex magnetizing fixture and magnetizing process to completely tailor the magnetic field of a uniform radius permanent magnet magnetic material disc 104. However, such a magnetizing fixture design can be extremely complex, and the magnetizing process can be quite variable and hard to control, providing inconsistent results. In one embodiment of the invention, the magnetization fixture design is simplified, and the process variabilities are reduced, by incorporating a variable air gap between the magnetic material disc 104 and the magnetic field sensors 116 as another way to control the shape of the magnetic field.

For the simple case of a magnetic material disc 104 including a permanent magnet, and the desired $Y(\theta_M)$ being a sinusoid, it is useful to design the radial air gap between the edge of the magnetic material disc and the magnetic field sensor so that the inverse of the radial air gap distance includes a sinusoidally varying component. This inverse relationship follows from the desire to have a sinusoidally varying component in the air gap permeability, and the fact that magnetic permeability is inversely proportional to the air gap distance. Define the following terms as:

$R_o \rightarrow$ radial distance from shaft to magnetic field sensors
P $\rightarrow$ number of magnetic pole pairs
$g(\theta_M) \rightarrow$ air gap distance from the magnetic material disc surface to the magnetic field sensor
$R_M(\theta_M) \rightarrow$ radius of magnetic material disc
$g_{min} \rightarrow$ minimum air gap
$g_{max} \rightarrow$ maximum air gap Then, the air gap distance is:

$$g(\theta_M) = (2g_{min}g_{max})/\{(g_{max}-g_{min}) \sin(P\theta_M)+(g_{max}+g_{min})\}$$

$$g(-\pi/2) = g_{max}$$

$$g(0) = (2g_{min} g_{max})/\{(g_{max}+g_{min})\}$$

$$g(-\pi/2) = g_{min}$$

The radius of the magnetic material disc is just the magnetic field sensor radius minus the air gap distance, i.e.:

$$R_M(\theta_M) = R_o g(\theta_M)$$

Holding the desired magnetic field sensor radius $R_o$ constant, the minimum and maximum gap values are then iterated until the resulting field exhibits the desired sinusoidal shape and amplitude. The magnetizing fixture for this magnetic material disc would be P crossed solenoidal fields. In another embodiment, the magnetic circuit may be closed by a return path concentric to the shaft and at a larger radius than the magnetic field sensors to increase the magnetic field strength and to make the relative effect of the air gap variation with position stronger. The return path may include high mu material, or other magnetically permeable material.

Figure 2:
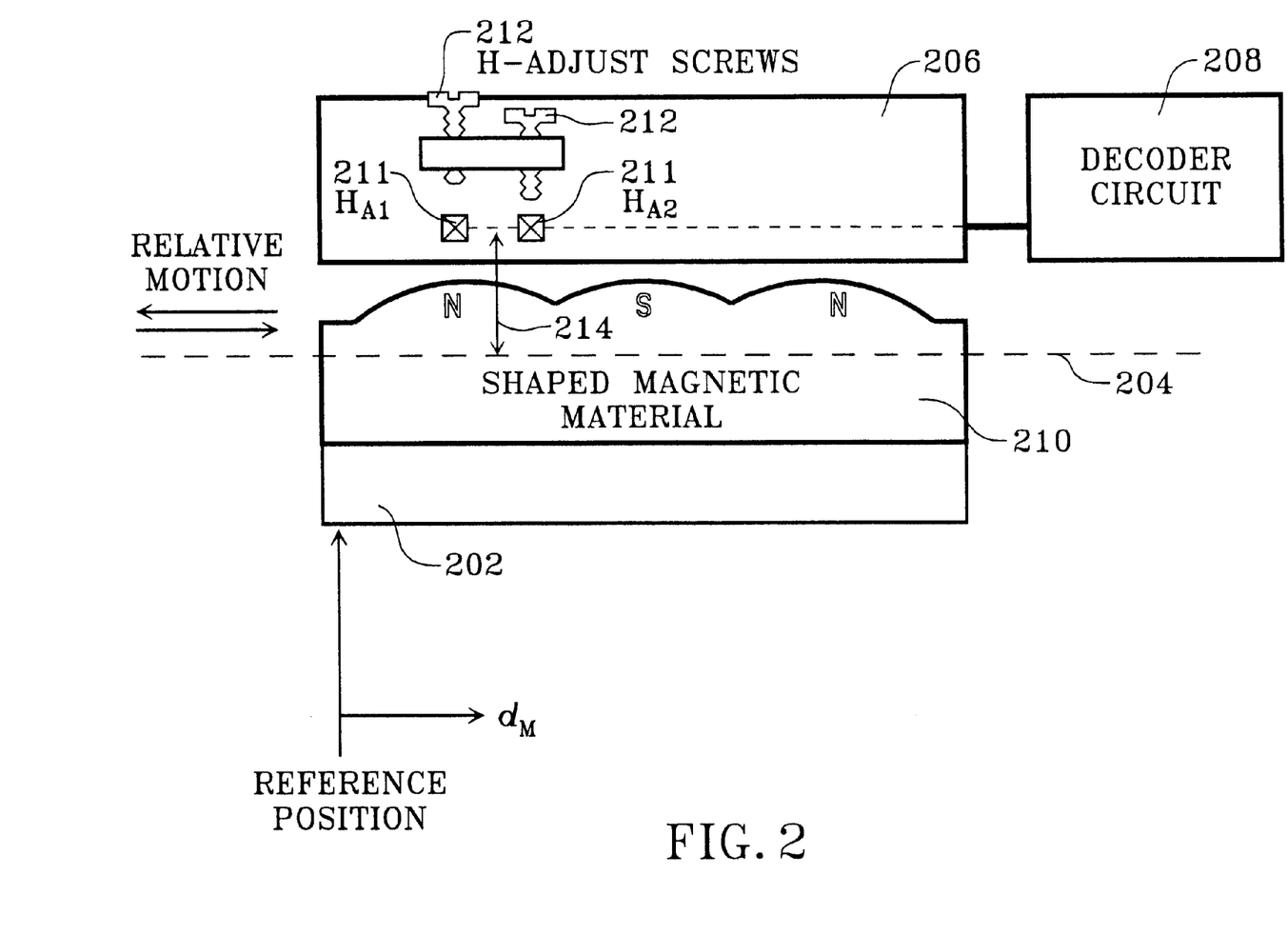
FIG. 2 illustrates a schematic view of one preferred embodiment of an improved linear position encoder.

FIG. 2 shows another embodiment of the an improved position encoder 200. The embodiment of FIG. 2 may be used to measure the linear position of an object with respect to a fixed reference position (e.g., position offset distance $d_M=0$), and includes an elongated object 202 movable along a linear axis 204, a sensor assembly 206, and a decoder circuit 208 electrically coupled to the sensor assembly. The elongated object 202 includes a magnetic material component 210 having a predetermined magnetic field characteristic. This field characteristic may include a substantially constant magnetic field, produced for example by permanent magnet or a conductor carrying a direct current. Alternately, the predetermined field characteristic may include a magnetic field having a time varying amplitude that varies in a predetermined manner, e.g., sinusoidal amplitude modulation. In one embodiment, the magnetic material component 210 is fabricated entirely from one of several permanent magnet materials known to those in the art, or a combination thereof. In alternate embodiments, the magnetic material component 210 includes a permanent magnet, an electromagnet, a high mu material (i.e., a material having a relatively high magnetic permeability), or non-magnetic materials, or a combination thereof (e.g., for a hub to mount the disc onto the shaft). In another embodiment, the magnetic field originates from an electromagnet, driven synchronously by a sinusoidal source, to produce an amplitude modulated magnetic field. In yet another embodiment, the elongated object 202 and the magnetic material component may be combined or integrated to form a single movable component that produces a magnetic field. In all of the preferred embodiments, the magnetic material component 210 produces a magnetic field that varies spatially with respect to the linear offset position $d_M$ of the elongated object 202 along the linear axis 204. In FIG. 2, the magnetic field produced by the magnetic material component 210 is oriented in a direction substantially normal to the linear axis 204.

As with the rotary example of FIG. 1, the magnetic material is shaped to vary the air gap between the magnetic material and the magnetic field sensor as the elongated object 202 moves, so that the magnetic field shape sensed by the magnetic field sensor can be controlled with greater accuracy and predictability than via a conventional magnetizing fixture. Similar to the rotary example of FIG. 1, the linear form of the invention includes multiple magnetic field sensors 211 distributed along the sensor assembly 206 at intervals of less than 180 electrical degrees and positioned at a sensor offset position 214. The decoding circuit 208 receives the position dependent signals from the magnetic field sensor 211 outputs and processes the position dependent signals to extract the linear position information in a manner analogous to that described herein for the rotary example of FIG. 1.

FIG. 2 also shows a simple way to correct for variations in magnetic field sensor output amplitudes. Output amplitude variation between the magnetic field sensor outputs can be caused by imperfections in the magnetic field sensor scale factor or by variation in the distance between the magnetic field sensor and the magnetic body. Although shown herein only for the linear case, this correction method may also be used for the rotary position encoder application. High magnetic permeability adjustable slugs or screws 212 (hereinafter referred to as "H-adjust screws"), fabricated from a high permeability material known to those in the art such as iron, steel, cobalt, nickel, ferrites, mu metal, various alloys or combinations thereof, are mounted behind the magnetic fields sensors in line with the field being sensed. If a particular sensor output is lower than desired, then the screw 212 is adjusted to be positioned closer to the back of the sensor, so that the screw 212 increases the flux density at that sensor. If a particular sensor output is higher than desired, then the screw 212 is adjusted to be positioned further away from the back of the sensor, so that the screw 212 decreases the flux density at that sensor. The gain variation caused by the non-ideal magnetic field sensor may be mitigated via electronic calibration in the sensor assembly 206 or in the decoding circuit 208. However, correcting the gain on the magnetic field sensor assembly 206 via electronic calibration is typically more expensive than the H-adjust screws shown in this embodiment, and correcting the gain variation in the decoding circuit 208 requires that the sensor assembly 206 and the decoding circuitry 208 be calibrated together. Using the H-adjust screws or electronic adjustment on the magnetic field sensor assembly 206 allows sensors and decoders to be readily interchanged, and still have the interchanged sets be calibrated.

There can also be measurement errors caused by incorrect location of the magnetic field sensors in a direction parallel to the relative motion, i.e. perpendicular to the air gap. In FIG. 2 this error occurs if the distance between the two sensors does not match ¼ of the pitch between consecutive North poles. In FIG. 1 this error occurs if the angular distance between consecutive sensors is not exactly 120 electrical degrees.

Consider the case shown in FIG. 1 where the location of $H_{A2}$ is assumed arbitrarily to be exactly $\pi/3$ in electrical degrees. $H_{A1}$, and $H_{A3}$ are assumed to be misplaced from the ideal $2\pi/3$ electrical degree spacing by $\theta_1$ and $\theta_3$ respectively. With H-adjust screws, or appropriate electrical adjustment, each of the three sensor output amplitudes can be adjusted individually. If the position decoding electronics uses two line-line outputs, then the three sensor gain adjustments can be used to set the two line-line amplitudes to the desired value and to correct for the non-ideal angular locations.

To prove that the line-line output amplitudes and the relative phase shift between the two line-line outputs can be calibrated first define the define the individual signals and the line-line quantities.

$$\theta_E = P*\theta_M + \pi/3$$

where P is the magnetic pole pair count $$Y_{A1}(\theta_E) = A_1 \cos(\theta_E + \pi/3 + \theta_1)$$

$$Y_{A2}(\theta_E) = A_2 \cos(\theta_E - \pi/3)$$

$$Y_{A3}(\theta_E) = A_3 \cos(\theta_E - \pi + \theta_3)$$

$$X_{A1}(\theta_E) = Y_{A1}(\theta_E) - Y_{A2}(\theta_E)$$

$$X_{A2}(\theta_E) = Y_{A2}(\theta_E) - Y_{A3}(\theta_E)$$

Now use the desired amplitude match and the desired 120 electrical degree phasing to relate the two line-line signals.

$$X_{A2}(\theta_E + 2\pi/3) = X_{A1}(\theta_E)$$

$$A_2 \cos(\theta_E - \pi/3 + 2\pi/3) - A_3 \cos(\theta_E - \pi + \theta_3 + 2\pi/3) = A_2 \cos(\theta_E + \pi/3 + \theta_1) - A_2 \cos(\theta_E - \pi/3)$$

$$A_2[\cos(\theta_E + \pi/3) + \cos(\theta_E - \pi/3)] = A_1 \cos(\theta_E + \pi/3 + \theta_1) + A_3 \cos(\theta_E - \pi/3 + \theta_3)$$

$$A_2[(2/2)\cos(\theta_E)] = A_1 \cos(\theta_E) \cos(\pi/3 + \theta_1) + A_3 \cos(\theta_E)\cos(-\pi/3 + \theta_3) + -A_1 \sin(\theta_E)\sin(\pi/3 + \theta_1) - A_3 \sin(\theta_E)\sin(-\pi/3 + \theta_3)$$

Since sine and cosine are orthogonal functions, then the above can be separated into two simultaneous equations.

$$A_2 = A_1 \cos(\pi/3 + \theta_1) + A_3 \cos(-\pi/3 + \theta_3)$$

$$0 = -A_1 \sin(\pi/3 + \theta_1) - A_3 \sin(-\pi/3 + \theta_3)$$

It should be appreciated that the correction can be provided with the decoding circuitry.

Although the above analysis has been described in connection with the FIGS. 1A and 1B rotary embodiment, the same mathematical analysis applies to the FIG. 2 linear embodiment.

Figure 3A:
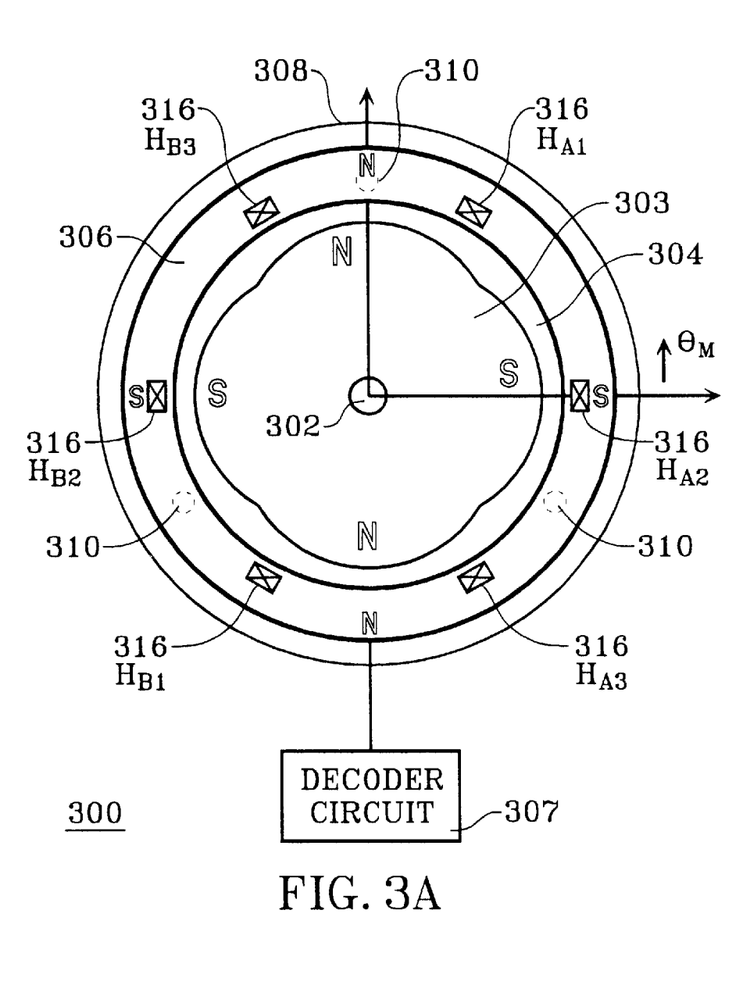
FIG. 3A illustrates an end schematic view of one preferred embodiment of an improved angular position encoder.
Figure 3B:
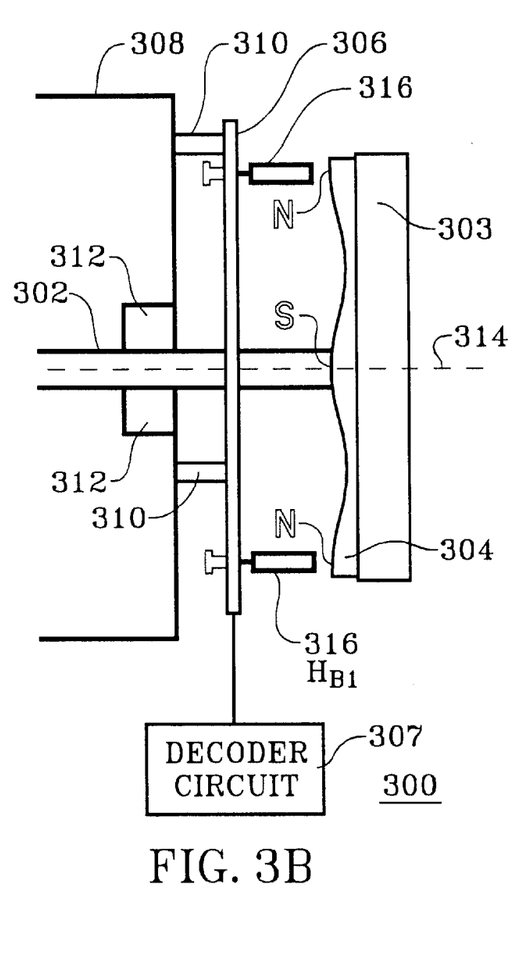
FIG. 3B illustrates a side schematic view of the FIG. 3A embodiment.

The principles of the present invention can be applied to other arrangements. For example, a second preferred embodiment of the rotary position encoder is shown in FIGS. 3A and 3B, the latter illustrating orthogonal schematic views of a second preferred embodiment of an improved position encoder 300 for measuring the angular position of an object with respect to a fixed reference position (e.g., rotational angle $\theta_M=0$). This embodiment includes a shaft 302, a disc 303 fixedly attached to the shaft 302 and supporting a magnetic "annulus" 304, a magnetic field sensor ring 306 axially spaced from the annulus 304, and a decoder circuit 307 electrically coupled to the sensor ring 306. The sensor ring 306 is fixedly mounted to the stator housing 308 via ring mounting supports 310 and support a plurality of magnetic field sensors 316. The stator housing 308 supports the bearings 312 that rotatably secure the shaft 302 to the stator housing 308. In this embodiment the "annulus" is a ring having a mean diameter (the average diameter between the inner and outer diameters of the annulus) so that the magnetic field sensors 316 are axially spaced adjacent to the annulus as the disk 303 rotates about its axis. The confronting surface of the magnetic annulus is contoured so as to provide the non-uniform gap as prescribed in accordance with the present invention, so as to produce a sinusoidal variation with the rotational position of the disk. The thickness of the ring varies from a maximum thickness (providing the minimum air gap, $g_{min}$) to a minimum thickness (providing the maximum air gap, $g_{max}$). The ring would be magnetized so that the maximum thickness locations provide alternating north and south poles of a magnetic field, while the minimum thickness locations provide zero magnetic flux. In this regard it should be appreciated that the term "magnetic annulus" as used herein includes a substantially annular structure in which the minimum thickness parts of the ring include any minimum thickness including zero. Further, measurement errors caused by incorrect location of the magnetic field sensors can be corrected in the same manner as described above, with H-adjust screws as shown, or appropriate electrical adjustment.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An apparatus for providing an output indicative of the instantaneous position of a movable member along a range of motion with respect to a reference position, comprising:
a magnetic body being fixedly attached to said movable member, said body having a contoured surface and producing a magnetic field, wherein said movable member includes a shaft rotatable about a rotation axis, and a disc having an outer periphery defined by a non-uniform radius, said disc being fixedly attached to said shaft at a disc center such that said disc rotates within a plane substantially normal to said rotation axis, said magnetic body being fixedly attached to said disc;

at least two magnetic field sensors, each of said sensors being (i) disposed adjacent to said contoured surface of said magnetic body, (ii) fixed with respect to said reference position, and (iii) positioned apart from said other sensor, so as to form a non-uniform gap between said contoured surface and each of said magnetic field sensors, wherein each of said sensors produces a position dependent signal corresponding to a value of said magnetic field, said at least two magnetic field sensors including two sets of three magnetic field sensors disposed at angular intervals substantially equal to 120 electrical degrees; and, a decoding circuit electrically coupled to each of said magnetic field sensors so as to receive each of said position dependent signals, said decoding circuit producing an output position dependent signal being a predetermined function of said position dependent signals, wherein said magnetic field sensors are disposed about said outer periphery at substantially equal radii with respect to said rotational axis;

wherein said predetermined function of said position dependent signals includes a difference between two said sensors in either of said sets of three magnetic field sensors, so as to substantially cancel a 3N harmonic distortion term, N being an integer greater than or equal to one.

2. An apparatus for providing an output indicative of the instantaneous position of a movable member along a range of motion with respect to a reference position, comprising:
a magnetic body being fixedly attached to said movable member, said body having a contoured surface and producing a magnetic field;

at least two magnetic field sensors, each of said sensors being (i) disposed adjacent to said contoured surface of said magnetic body, (ii) fixed with respect to said reference position, and (iii) positioned apart from said other sensor, so as to form a nonuniform gap between said contoured surface and each of said magnetic field sensors, wherein each of said sensors produces a position dependent signal corresponding to a value of said magnetic field;

a decoding circuit electrically coupled to each of said magnetic field sensors so as to receive each of said position dependent signals, said decoding circuit producing an output position dependent signal being a predetermined function of said position dependent signals; wherein
i) said movable member includes an elongated object movable along a linear axis, said elongated object having at least one exterior surface substantially parallel to said linear axis; and, ii) said magnetic field sensors are disposed along said exterior surface at substantially equal perpendicular distances with respect to said linear axis.

3. An apparatus for providing an output indicative of the instantaneous position of a movable member along a range of motion with respect to a reference position, comprising:
a magnetic body being fixedly attached to said movable member, said body having a contoured surface and producing a magnetic field;

at least three magnetic field sensors, each of said sensors being (i) disposed adjacent to said contoured surface of said magnetic body, (ii) fixed with respect to said reference position, and (iii) positioned apart from said other sensors, so as to form a non-uniform gap between said contoured surface and each of said magnetic field sensors, wherein each of said sensors produces a position dependent signal characterized by an amplitude, said position dependent signal corresponding to a value of said magnetic field;

a decoding circuit electrically coupled to each of said magnetic field sensors so as to receive each of said position dependent signals, said decoding circuit producing an output position dependent signal being a predetermined function of said position dependent signals; further including calibration of measurement errors caused by incorrect location of the magnetic field sensors via individual adjustment of the position dependent signal amplitudes.

4. A method of calculating an air gap distance between a magnetic field sensor and a magnetic disc of a rotary position encoding apparatus, so as to produce a magnetic field having a substantially sinusoidal characteristic at said sensor as said disc rotates past said sensor, said disc having a center and a perimeter, and being disposed within a plane, each point on said perimeter being defined by an angle $\theta_M$ measured from a reference radius, comprising the steps of:

defining a maximum air gap distance $g_{max}$ from said sensor to said disc, a minimum air gap distance $g_{min}$ from said sensor to said disc, and a desired sensor radius from said center to said sensor;

defining a general air gap distance formula being a function of said maximum air gap distance and said minimum air gap distance, and such that said general air gap distance includes a sinusoidally varying component;

holding said desired sensor radius constant while iterating said maximum air gap distance and said minimum air gap distance until said magnetic field exhibits said substantially sinusoidal characteristic.

5. A method according to claim 4, further including the step of providing a general air gap distance formula of the form:

$$g(\theta_M) = (2g_{min}\, g_{max})/\{(g_{max}-g_{min})\sin(P\theta_M)+(g_{max}+g_{min})\},$$

where $g(\theta_M)$ is the air gap distance at a given angle $\theta_M$, and P is the number of magnetic poles on said magnetic disc.

6. A method of calculating an air gap distance between a magnetic field sensor and an elongated magnetic body of a linear position encoding apparatus so as to produce a magnetic field having a substantially sinusoidal characteristic at said sensor as said magnetic body moves past said sensor, said magnetic body movable along a linear axis, comprising the steps of:

defining a maximum air gap distance $g_{max}$, from said sensor to said magnetic body, a minimum air gap distance $g_{min}$ from said sensor to said magnetic body, and a desired sensor offset distance from said linear axis to said sensor;

defining a general air gap distance formula being a function of said maximum air gap distance and said minimum air gap distance, and such that said general air gap distance includes a sinusoidally varying component;

holding said desired sensor offset distance constant while iterating said maximum air gap distance and said minimum air gap distance until said magnetic field exhibits said substantially sinusoidal characteristic.

7. A method according to claim 6, further including the step of providing a general air gap distance formula of the form:

$$g(d_M) = (2g_{min}\, g_{max})/\{(g_{max}\, g_{min})\sin(Pd_M)+(g_{max}+g_{min})\},$$

where $g(d_M)$ is the air gap distance at a given position offset distance $d_M$, and P is the number of magnetic poles on said magnetic body.

8. An apparatus for providing an output indicative of the instantaneous position of a movable member along a range of motion with respect to a reference position, comprising:

a magnetic body being fixedly attached to said movable member, said body having a contoured surface and producing a magnetic field;

at least two magnetic field sensors, each of said sensors being (i) disposed adjacent to said contoured surface of said magnetic body, (ii) fixed with respect to said reference position, and (iii) positioned apart from said other sensor, so as to form a non-uniform gap between said contoured surface and each of said magnetic field sensors, wherein each of said sensors produces a position dependent signal corresponding to a value of said magnetic field; and, a decoding circuit electrically coupled to each of said magnetic field sensors so as to receive each of said position dependent signals, said decoding circuit producing an output position dependent signal being a predetermined function of said position dependent signals;

wherein each of said magnetic field sensors further includes at least one adjustment screw disposed substantially adjacent to said magnetic field sensor so as to interact with said magnetic field, wherein said position dependent signal varies as a predetermined function of a relative distance from said magnetic field sensor to said adjustment screw, and the magnetic sensors are each axially spaced from the contoured surface of the magnetic body.

9. An apparatus for providing an output indicative of the instantaneous position of a movable member along a range of motion with respect to a reference position, comprising:

a magnetic body being fixedly attached to said movable member, said body having a contoured surface and producing a magnetic field;

at least two magnetic field sensors, each of said sensors being (i) disposed adjacent to said contoured surface of said magnetic body, (ii) fixed with respect to said reference position, and (iii) positioned apart from said other sensor, so as to form a non-uniform gap between said contoured surface and each of said magnetic field sensors, wherein each of said sensors produces a position dependent signal corresponding to a value of said magnetic field; and, a decoding circuit electrically coupled to each of said magnetic field sensors so as to receive each of said position dependent signals, said decoding circuit producing an output position dependent signal being a predetermined function of said position dependent signals; wherein i) said movable member includes a shaft rotatable about a rotation axis, and a disc having an outer periphery defined by a non-uniform radius, said disc being fixedly attached to said shaft at a disc center such that said disc rotates within a plane substantially normal to said rotation axis, said magnetic body being fixedly attached to said disc; and, ii) the magnetic sensors are each axially spaced from the contoured surface of the magnetic body.

* * * * *

UNITED STATES PATENT AND TRADEMARK OFFICE
CERTIFICATE OF CORRECTION

PATENT NO. : 6,433,536 B1  Page 1 of 1
DATED : August 13, 2002
INVENTOR(S) : George B. Yundt et al.

It is certified that error appears in the above-identified patent and that said Letters Patent is hereby corrected as shown below:

<u>Column 11,</u>
Line 66, correct the formula from:
" $g(d_M) = (2\ g_{min}\ g_{max}) / \{(\ g_{max}\ g_{min}) \sin(Pd_M) + (\ g_{max} + g_{min})\}$ "

to -- $g(d_M) = (2\ g_{min}\ g_{max}) / \{(\ g_{max} - g_{min}) \sin(Pd_M) + (\ g_{max} + g_{min})\}$ --

Signed and Sealed this

Seventeenth Day of December, 2002

JAMES E. ROGAN
*Director of the United States Patent and Trademark Office*